United States Patent [19]
Gaborski et al.

[11] Patent Number: 5,442,715
[45] Date of Patent: Aug. 15, 1995

[54] METHOD AND APPARATUS FOR CURSIVE SCRIPT RECOGNITION

[75] Inventors: Roger S. Gaborski; Lori L. Barski, both of Pittsford, N.Y.

[73] Assignee: Eastman Kodak Company, Rochester, N.Y.

[21] Appl. No.: 863,911

[22] Filed: Apr. 6, 1992

[51] Int. Cl.⁶ .......................... G06K 9/34; G06K 9/00; G06K 9/72; G06K 9/62
[52] U.S. Cl. .................................. 382/187; 382/173; 382/156; 382/229
[58] Field of Search .................. 382/9, 13, 18, 14, 10, 382/40; 395/22, 23

[56] References Cited

U.S. PATENT DOCUMENTS

| | | | |
|---|---|---|---|
| 3,111,646 | 11/1963 | Harmon | 340/146.3 |
| 3,127,588 | 3/1964 | Harmon | 340/146.3 |
| 3,133,266 | 5/1964 | Frishkopf | 340/146.3 |
| 4,024,500 | 5/1977 | Herbst et al. | 340/146.3 |
| 4,028,674 | 6/1977 | Chuang | 340/146.3 |
| 4,654,873 | 3/1987 | Fujisawa et al. | 382/9 |
| 4,731,857 | 3/1988 | Tappert | 382/19 |
| 4,764,972 | 8/1988 | Yoshida et al. | 382/13 |
| 4,876,726 | 10/1989 | Capello et al. | 382/18 |
| 4,933,977 | 6/1990 | Ohnishi et al. | 382/9 |
| 5,048,097 | 9/1991 | Gaborski et al. | 382/14 |
| 5,052,043 | 9/1991 | Gaborski | 382/14 |
| 5,245,672 | 9/1993 | Wilson et al. | 382/9 |

OTHER PUBLICATIONS

"The State of the Art in On-Line Handwriting Recognition", Tappert et al., IEEE Transaction on Pattern Analysis and Machine Intelligence, vol. 12, No. 8, Aug. 1990, pp. 787–808.

*Digital Image Processing*, by Pratt, Second Edition, Wiley, 1991, pp. 458–472.

"A Multi-Level Perception Approach to Reading Cursive Script", S. Srihari and R. Bozinovic, Artificial Intelligence, Elsevier Science Publishers B.V. (North-Holland), vol. 33, 1987, pp. 217–255.

"Limited Vocabulary Script Reader", E. T. Smithline, IBM Technical Disclosure Bulletin, vol. 7, No. 6, Nov. 1984.

"Recognition of Handwritten Word: First and Second Order Hidden Markov Model Based Approach", Kundu et al., Pattern Recognition, vol. 22, No. 3, 1989, pp. 283–297.

"Computer Recognition of Arabic Cursive Scripts", El-Sheikh et al., Pattern Recognition, vol. 21, No. 4, 1988, pp. 293–302.

"Experiments in the Contextual Recognition of Cursive Script", IEEE Transactions on Computers, vol., C–24, No. 2, Feb. 1975, pp. 182–194.

Pattern Recognition, vol. 20, No. 5, 1987; Elmsford, N.Y.; pp. 475–485; R. M. Sinha "Rule based contextual post-processing for devanagari text recognition".

Pattern Recognition, vol. 23, No. 12, 1990, Elmsford, N.Y.; pp. 1311–1321; K. T. Lua et al "Recognizing chinese characters through interactive activation and competition".

*Primary Examiner*—Leo H. Boudreau
*Assistant Examiner*—Matthew C. Bella
*Attorney, Agent, or Firm*—Dennis R. Arndt

[57] ABSTRACT

A method and apparatus for performing cursive script recognition is disclosed, wherein a cursive word, in the form of digitized data or bitmap, is simultaneously segmented and individual characters of the word are recognized using a scanning window that moves across a word field or segment. The bitmap data is preprocessed before being presented to a moving window letter center finding neural network that determines the spatial location of the centers of individual letters. Character center data generated by the center finding neural network is then used to define the left and right edges of a fixed size window. The fixed window contains width normalized word segments that are presented to a second neural network which is taught to recognize the central character of the window based on portions of adjacent characters contained within the window. A final character recognition decision is made using a third neural network that combines the results of second neural network at three positions, namely, when the character to be recognized was in a precharacter position, a central position and a post character position relative to the third neural network.

2 Claims, 9 Drawing Sheets

METHOD AND APPARATUS FOR CURSIVE SCRIPT RECOGNITION

BACKGROUND

The present invention is generally directed to the field of optical character recognition. More specifically, the present invention is directed to a optical character recognition system that identifies characters written in cursive script.

Cursive script recognition (CSR) is generally considered to be the next frontier in the field of optical character recognition. With the advancement of computing technologies, it is believed that CSR will facilitate vast improvements in providing easy to use computer interfaces by eliminating the necessity of a keyboard. The ability to enter data by writing in cursive script will open the use of computers to a wide variety of individuals which have never learned keyboard data entry skills.

CSR research has taken several approaches to the problem of recognizing cursive characters; including attempts at both individual character recognition and word recognition. The individual character recognition approach requires that a word be segmented into its individual character components prior to recognition and classification. Identification of appropriate character segmentation points, however, is extremely difficult in the case of cursive script. The word recognition approach has generally been limited to recognizing a very small number of words. Scaling of word recognition systems to recognize hundreds or thousands of words required in commercial applications is not presently feasible due to the resulting complexity and expense of such systems.

Conventional methods used to perform CSR recognition are also based on the extraction of features of the cursive characters or words. The extraction of features approach requires a great deal of custom algorithm development. Thus, modifying such a system to accommodate new character classes tends to be a very slow and tedious process.

In view of the above, it is an object of the invention to provide a method and apparatus for recognizing cursive script that does not require feature extraction or the task of separate segmentation of the word prior to recognition. In addition, it is an object of the invention to provide a CSR system that is flexible and can accommodate new character classes without requiring a redesign of the system.

SUMMARY OF THE INVENTION

The invention provides a method and apparatus for performing cursive script recognition, wherein a cursive word, in the form of digitized data or bitmap, is simultaneously segmented and individual characters of the word are recognized using a scanning window that moves across a word segment. In a preferred embodiment, the bitmap data is preprocessed (smoothed, deslanted and vertically scaled), before being presented to a moving window letter center finding neural network that determines the spatial location of the centers of individual letters. Character center data generated by the center finding neural network is then used to define the left and right edges of a fixed size window. The fixed window contains width normalized word segments, wherein the left side of the window is centered on a first character of the segment, the right side of the window is centered on a third character of the segment, and the center of the window is centered on a second character of the segment. The normalized word segments are presented to a second neural network that is taught to recognize the central second character of the window. More specifically, the neighboring first and third characters are categorized into groups based upon similarity in structure and the central character is identified relative to the structural relationship of the adjacent neighbors. A final character recognition decision is preferably made using a third neural network that combines the results of second neural network at three positions, namely, when the character to be recognized was in a precharacter position, a central position and a post character position relative to the third neural network.

BRIEF DESCRIPTION OF THE DRAWINGS

With the above as background, reference should now be made to the following description of the best mode of practicing the invention and the accompanying drawings, wherein.

DETAILED DESCRIPTION -

Figure 1:
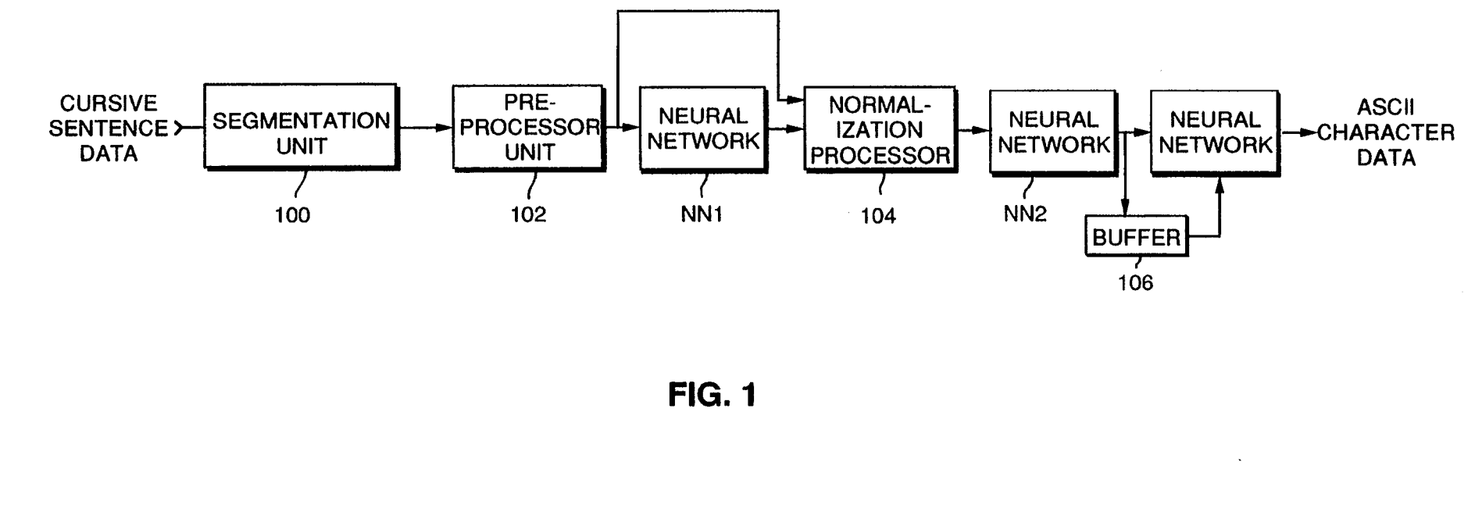
FIG. 1 is a functional block diagram of a CSR system according to the present invention.

A functional block diagram of the CSR system according to the present invention is illustrated in FIG. 1. Sentences of cursively written text are captured as digitized cursive sentence data using a scanning device, digital graphics input tablet, etc. (or on-line stroke data is converted to bitmap data) and the cursive sentence data is then segmented into cursive word data with a word segmentation unit 100. Preprocessing operations are then performed on the cursive word data by a preprocessor unit 102. After preprocessing, the cursive word data is supplied to the first of three neural networks NN1–NN3 which perform the character recognition functions. The first neural network NN1 identifies the centers of characters contained within the cursive word data and supplies the center information to a normalization processor 104. The normalization processor 104 normalizes the cursive word data based on the center information. The normalized cursive word data is then supplied to a second neural network NN2 in the form of segments that are presented within a window, wherein the segments contain a complete character to be recognized, which is approximately centered in the window, and portions of characters that are adjacent to the character to be recognized. The second neural network NN2 identifies the character to be recognized based, in part, on its relationship to the portions of the adjacent characters. As will be described in greater detail below, the output from the second neural network NN2 at three different time periods is supplied to a third neural network NN3 which verifies the identification of the character to be recognized.

Figure 2:
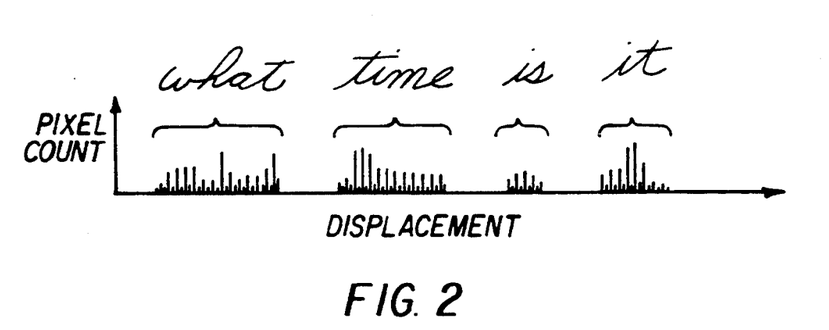
FIG. 2 illustrates a projection profile of cursive sentence text data that is used by the preprocessor illustrated in FIG. 1 to identify the boundaries of cursive word text data.

The word segmentation unit 100 utilizes a projection profile technique to identify and separate specific word data from the cursive image data. For example, as illustrated in FIG. 2, a vertical projection is formed by summing the number of active pixels represented by the cursive image data in a respective column passing through the cursive text to be recognized. The regions of the cursive text which contain words are represented by a positive number of pixels and spaces located between words of the cursive text have either zero or a very small number of pixels. The word segmentation unit 100 identifies cursive word boundaries by assuming all non zero pixel count regions, or all regions with a pixel count that exceeds a predetermined threshold, contain words.

Once word boundaries have been identified by the word segmentation unit 100, preprocessing operations, including smoothing, deslanting and height normalization, are performed on the cursive text data by the preprocessing unit 102. The preprocessing unit 102 accomplishes the smoothing process by convolving a small averaging kernel (for example a 3×3 or 5×5 kernel) with the word data contained within the identified word boundaries. The word data is in the form of a bitmap and, as the kernel is moved across the bitmap, the pixel of the bitmap that is overlaid with the central pixel of the kernel is replaced with the average of the pixels that the kernel overlays, which results in a smoother stroke.

In addition to smoothing the cursive image data, a stroke-thickening algorithm can be applied, particularly in cases where the data is representative of a one-pixel wide stroke, in order to make the stroke more "pen" like. Well known morphological image processing algorithms, as discussed in the publication *Digital Image Processing*, by Pratt, Second Edition, Wiley, 1991, pp. 458–473, the contents of which is incorporated herein by reference, can be employed by the preprocessing unit 102 to perform the stroke-thickening function.

The preprocessing unit 102 preferably accomplishes deslanting by using a technique described in a paper entitled "A Multi-Level Perception Approach to Reading Cursive Script", S. Srihari and R. Bozinovic, Artificial Intelligence, Elsevier Science Publishers B.V. (North-Holland), Vol. 33, 1987, pp. 217–255, the contents of which is incorporated herein by reference, although other techniques can be readily employed. Basically, horizontal line elements within the cursive script characters are progressively eliminated until only the slanted portions of the characters remain. The slant angles of the remaining portions are then determined and are used to correct for the slant of the characters.

Figure 3:
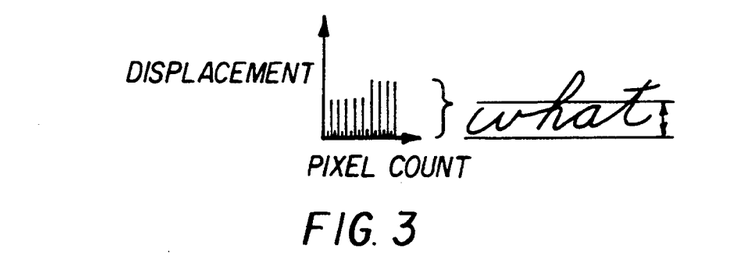
FIG. 3 illustrates a projection profile of cursive sentence text data that is used by the preprocessor illustrated in FIG. 1 for height normalization.

The performance of height normalization is generally necessary because the size of the written words varies with individual writers. A preferred height normalization technique employed by the preprocessor 102 will be described with reference to FIG. 3. The height of the main body of the word (excluding ascenders and descenders) is estimated by constructing a horizontal projection profile. The horizontal projection profile is similar to the projection profile employed for word segmentation, but the pixels are summed in horizontal rows instead of vertical columns. For most words, the main body region will have the greatest number of pixels and the ascender and descenders, if they exist, will have smaller values. The width of the greatest region is assumed to be the height of the main body of the word. For example, identifying the height of the main body as Wd and the desired height as W, the preprocessor 102 scales the data by the value W/Wd.

After preprocessing, the word data is supplied to the first of the three neural networks NN1–NN3 which perform actual classification operations on the data to identify specific characters. The classification operations performed by the neural networks NN1–NN3 include: classifying centers, non-center and space conditions within a moving overlay window that is superimposed on the cursive word data; classifying characters in the center, left and right regions of a window; and performing a final classification of the center character. A general overview of neural networks will be provided below prior to discussing the individual functional aspects of each of the three neural networks NN1–NN3.

Figure 4:
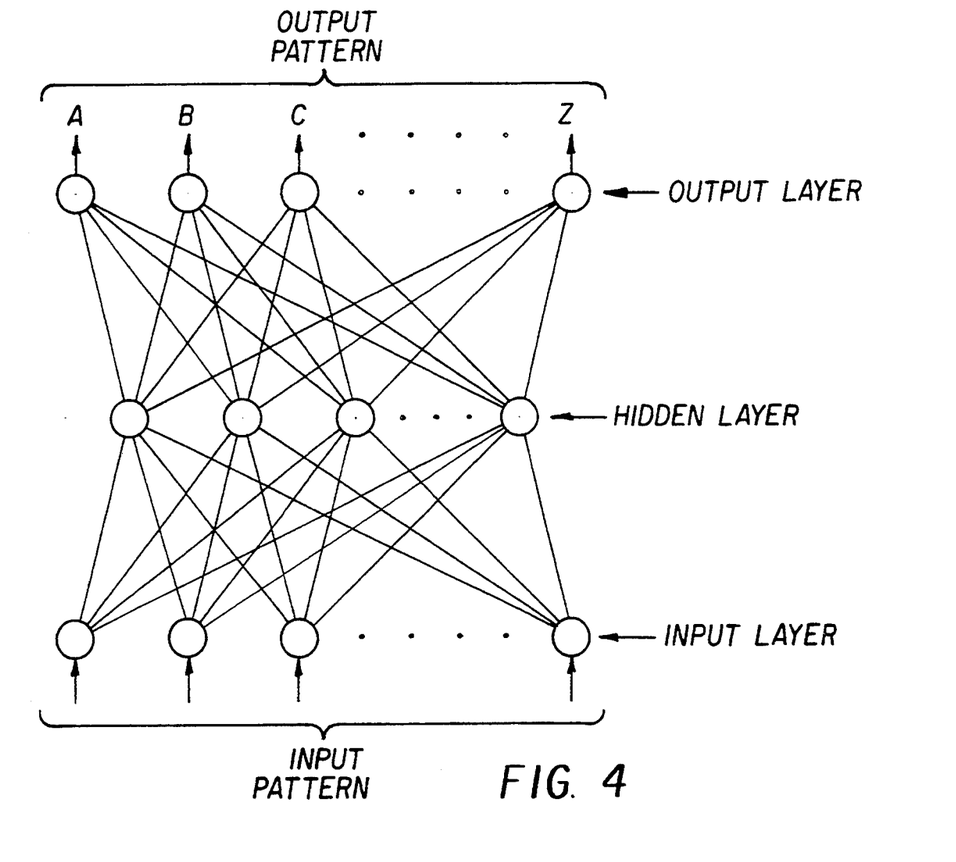
FIG. 4 illustrates a typical backward error propagation (BEP) learning network that can be employed for the neural networks NN1-NN3 illustrated in FIG. 1.

Digital neural networks are modeled after biological neural systems and contain hundreds of highly interconnected simple processing units. The specific network used in this disclosure utilizes a multilayer perceptron with backward error propagation (BEP) learning. As shown in FIG. 4, a typical BEP network is composed of an input layer, output layer and one or more hidden layers. The neurons are connected to each other, one layer to the next, by a set of weights. The values of the weights are determined during training using a supervised learning algorithm that minimizes the mean square difference between the desired and the actual net outputs. This difference or error is then propagated backwards from the output layer to the input layer. Many thousands of patterns are processed through the network with the weights being adjusted after each pattern. Eventually, the error between the target vectors and actual output vectors reaches a threshold low enough to stop training. Testing is the performed with the weights "frozen" (no more learning) by performing only the forward pass of the input data to the output layer. The highest activation in the output vector corresponds to the correct class.

The neural network in FIG. 4 is labelled as an example of a neural network utilized for optical character recognition, wherein the input data is a digital bitmap (n×m) of a normalized character and the output layer represents the character output states of the network, for example A–Z. When the bitmap of the letter A is supplied to the network, the output node "A" should have the greatest value. The input bitmap is defined as the input vector where the output vector is the values of the 26 output nodes. Details of this class of neural network and the BEP algorithm can be found in the publication *Parallel Distributed Processing*, J. McClelland and D. Rumelhart, Vol. 1, MIT Press, 1986, the contents of which is incorporated herein by reference, and in U.S. Pat. No. 5,048,097 issued to Gaborski et al., the contents of which is incorporated herein by reference.

Referring back to FIG. 1, the first neural network NN1 of the CSR system determines the centers of characters in cursive words and will be referred to as the "letter center finding" network. The results produced by the letter center finding network NN1 facilitate horizontal normalization for the next level of classification. The objective of normalizing horizontally is to have slightly less than two characters within the overlay window. Preferably, when a character is centered within the window, one-half of an adjacent character will be on the left of the centered character and one-half of an adjacent character will be on the right of the centered character within the window.

Figure 5:
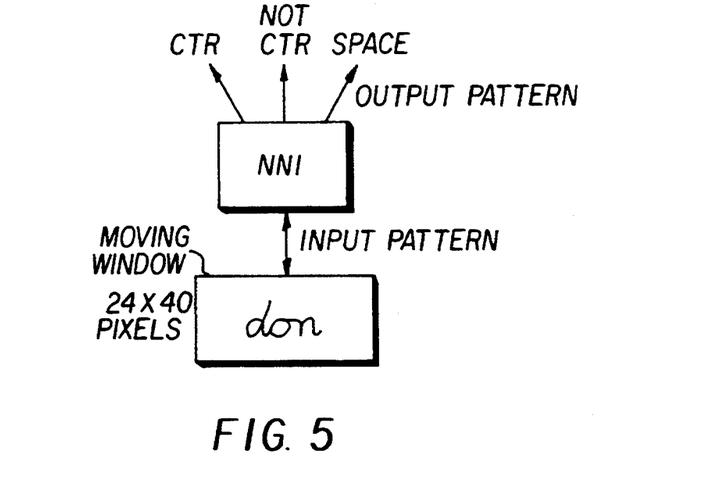
FIG. 5 illustrates the training of the first neural network NN1 shown in FIG. 1 by supplying a moving window, consisting of a 24×40 matrix of pixel data, to the input pattern of the first neural network NN1.
Figure 6:
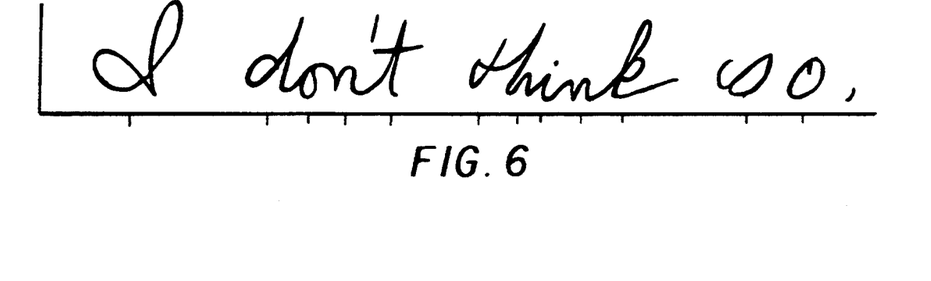
FIG. 6 illustrates training data supplied to the first neural network NN1.

As illustrated in FIG. 5, the letter center finding network (NN1) is trained using the moving window (24×40 in the preferred embodiment) which travels from left to right over the bitmap, skipping every other pixel. Training data consists of bitmaps of words which have their character centers labeled, i.e., the x-coordinate of the center of each character is known as shown in FIG. 6. The output vector of the network consists of three nodes corresponding to three cases: the window centered over a character (CTR); the window not centered over a character (NOT CTR); and the window centered on a space (SPACE). For example, when the window is between characters (not centered), a low activation occurs as the CTR node, a high activation occurs at the NOT CTR node and a low activation occurs at the SPACE node; when the window is centered over a character, a high activation occurs at the CTR node, a low activation occurs at the NOT CTR node and a low activation occurs at the SPACE node; and when the window is centered over a space, both the CTR and NOT CTR nodes have low activations and the SPACE node is high.

Figure 7:
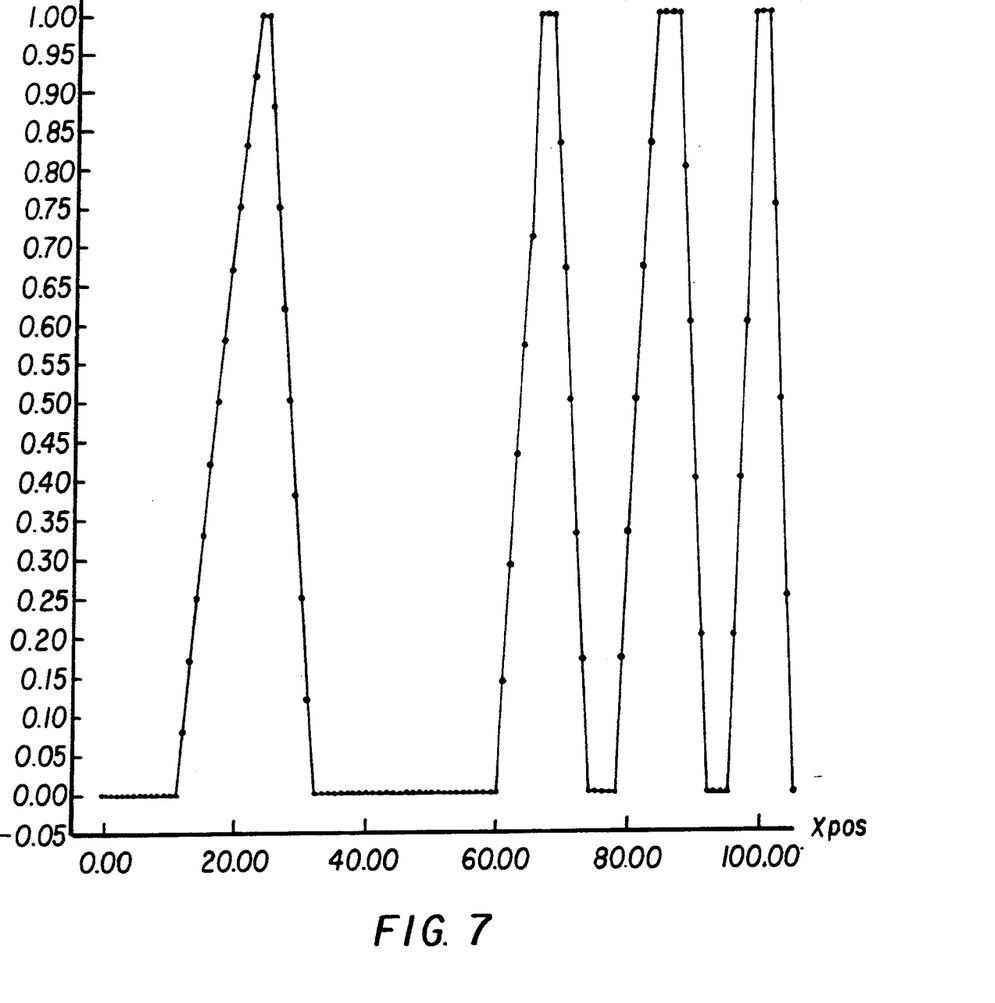
FIG. 7 illustrates a sequence of training activations of the CTR node of the first neural network NN1 as the moving overlay window supplied to the input pattern of the first neural network NN1 moves across a portion of the training data illustrated in FIG. 6.
Figure 8:
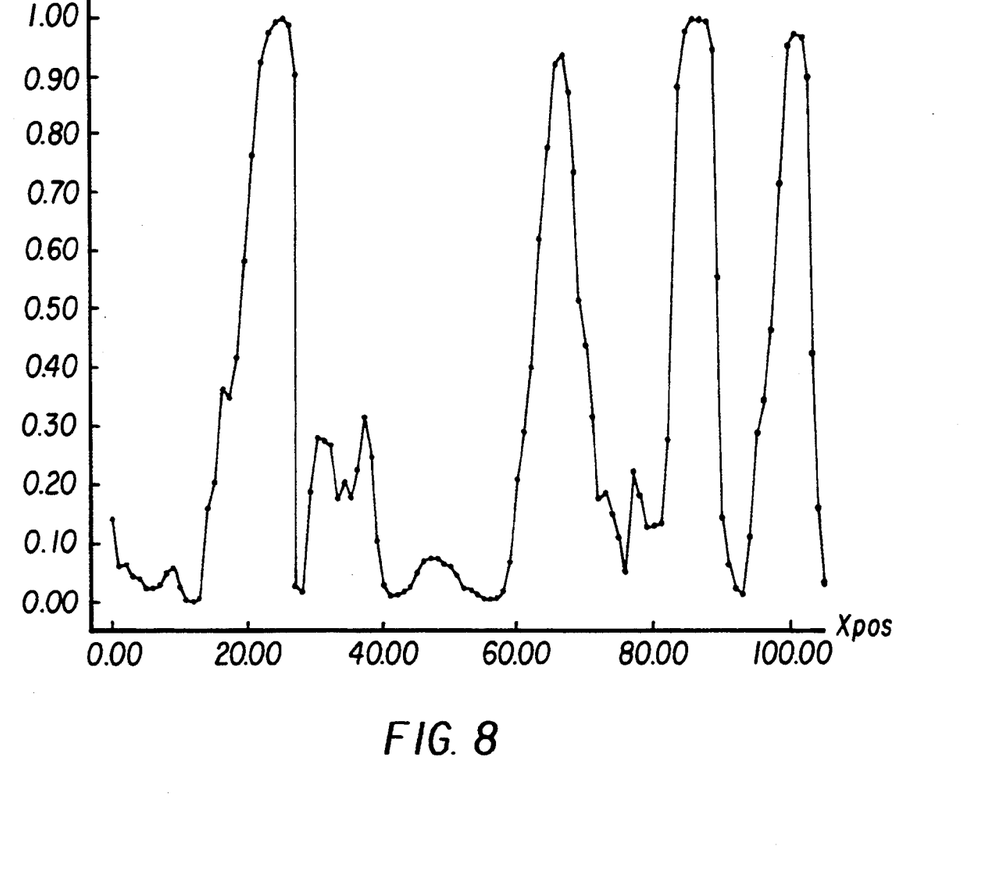
FIG. 8 illustrates the actual output of the first neural network NN1 after training is completed.

FIG. 7 shows the sequence of training activations of the CTR node as the window moves across the "I don" portions of the shown image. The NOT CTR node training activations are the inverse of the CTR node activations (not shown). As can be seen from FIG. 7, the center of the "I" is at Xpos 20, the "d" is at Xpos 67, the "o" 85 and so forth. The actual output of this network after training is shown in FIG. 8. The network's output peaks at the positions corresponding to the center of the letters.

Figure 9:
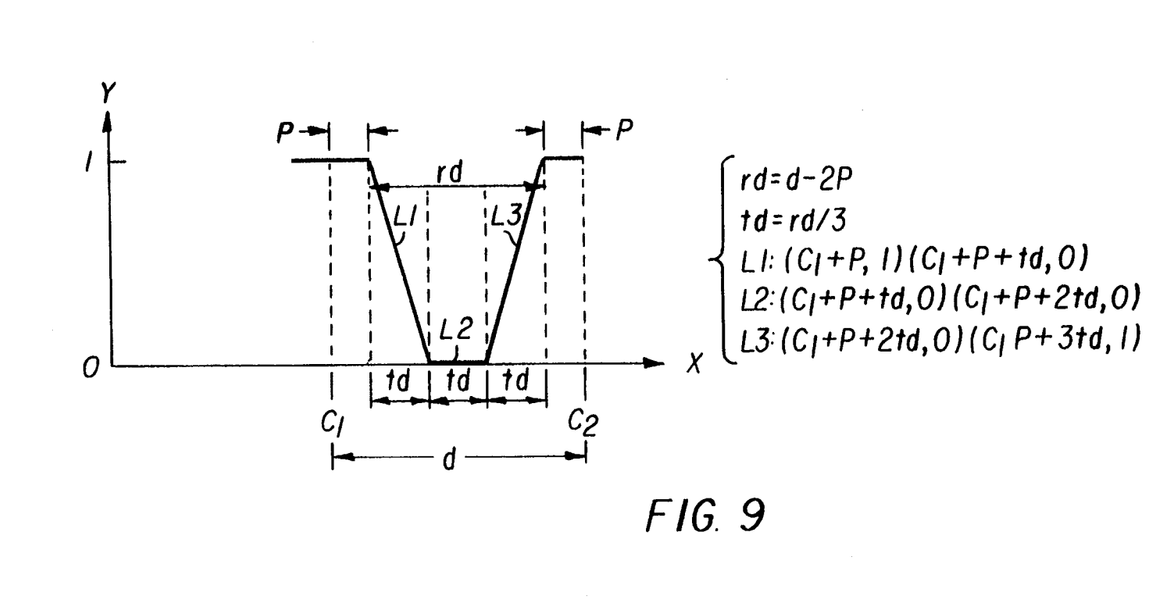
FIG. 9 illustrates a ramping function that is utilized in connection with the training data.

It should be noted that a ramping function is employed in the training data to aid in the identification of the centers of the characters. FIG. 9 illustrates a preferred ramping function wherein the ramp distance (rd) is calculated by subtracting the length of the two plateau regions (p) from the distance (d) between two character centers (C1, C2). The ramp distance (rd) is then divided into thirds to determine a base distance (td). Three lines that characterize the ramp function (L1, L2, L3) can then be defined.

During operation, the neural network NN1 finds the center of the characters contained in the cursive word data and supplies this information to the normalization processor 104. The normalization processor 104 scales the cursive word data so that the center of a first character will be at the left edge of the overlay window, the center of a second character to be recognized will be approximately centered in the window, and the center of the third character will be on the right edge of the overlay window. The normalized cursive word data is then supplied to the second neural network NN2.

Figure 10:
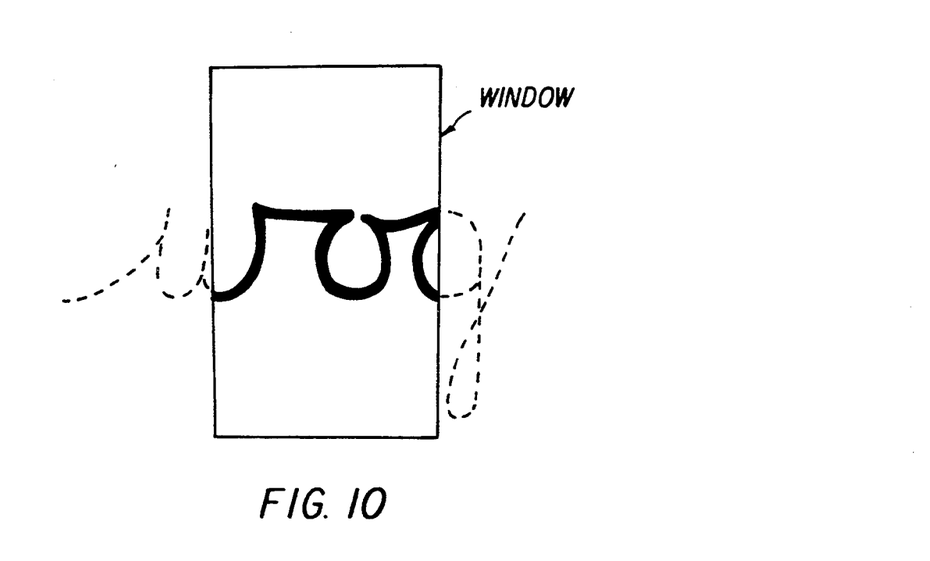
FIG. 10 illustrates the location of a word segment within the moving overlay window.
Figure 11:
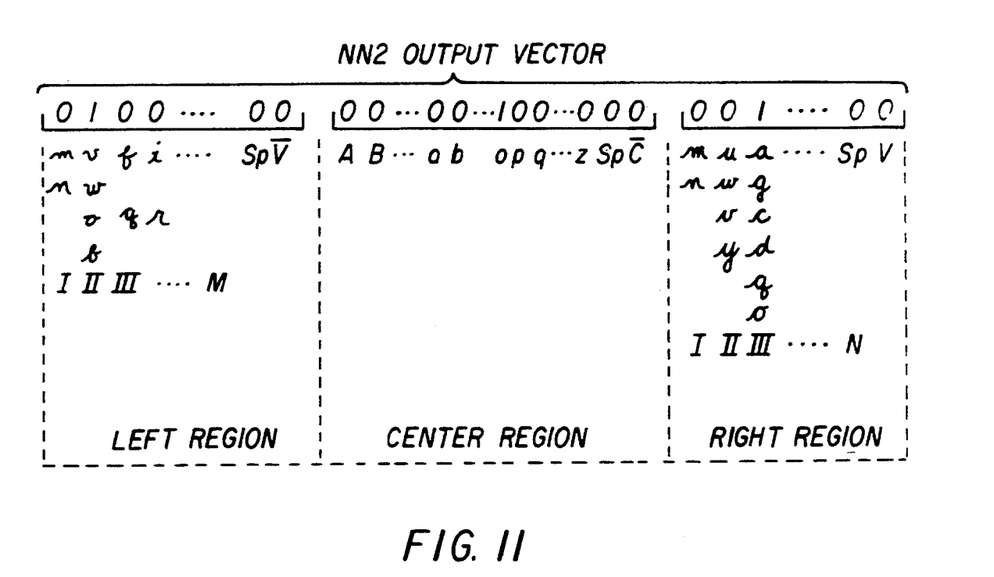
FIG. 11 illustrates the output of the second neural network with respect to the word segment shown in FIG. 10.

The second neural network NN2 is used to identify valid central characters within the moving overlay window applied to its input pattern and also makes intelligent guesses of which characters are on the left and right sides of the window. Referring to FIG. 10, the window presented to the input pattern of the second neural network NN2 consists of one whole character (in the center) and partial characters located before and after the central character. As illustrated in FIG. 11, the output vector of the second neural network NN2 is set up to classify not only a single character, but instead, to classify the central character and a class grouping for the previous and post characters, thereby capturing the ligature information related to the adjacent letters. Class groupings can be as general as one group per character (A–Z) or more specific based upon the nature of the data, as presented FIG. 11. One advantage of using a separate group per character is that natural clusters can be allowed to form which can later be combined thus reducing the number of output nodes and therefore the overall size of the network. Utilization of this method also removes the requirement of accurate segmentation of cursive words into individual letters.

The intelligent guesses made by the second neural network NN2 are a function of the ligatures, the adjacent visible character parts, and the context of the language being recognized. Context information is introduced into the second neural network NN2 by the natural frequency of occurrence of character trigrams (three letter triplets) appearing in the training data. In order to teach the second neural network NN2 ligatures and character parts, it is necessary to create a large quantity of training data based upon typical words. Samples of cursive words written by many people are preprocessed and the center of the characters are determined by the first neural network NN1. Next, segments of cursive word bitmap data are horizontally normalized so that the bitmap from the center of the first character to the center of the third character occupy the window. This data is then applied to the second neural network NN2. If a space is present in the left or right regions of the window, an appropriate left or right space flag (Sp) will be set. Thus, training consists of presenting a large quantity of characters labeled as described above that have a frequency distribution similar to the English language in order to ensure that the context of the language is represented in the network.

The output vector of the second neural network NN2 therefore contains three sections of information. The first section describes the image located in the left region of the window. The second section describes the image information found in the center of the window, and similarly, the third section of the output vector describes the image located in the right region of the window. FIG. 10 shows the word segment "wog" for the window centered over the "o". The left side of the window subtends the "w". Not knowing the full character structure, a guess is made (based on information learned from the training data) that the portion of the "w" showing belongs to the group of characters including a v, w, o, or b. Similarly, the right side of the window subtends the "g" and a guess is made that the visible part of the g belongs to an a, g, c, d, q or o.

The prediction of what character is ahead (pre) and behind (post) in the window in addition to the character centered in the window provides an advantage over simply identifying the second character, namely, the information related to the pre-character and post-character provides additional information about the center character which can be utilized to verify that the center character has been properly identified. In a preferred embodiment, the output vector of the second neural network NN2, which contains left region data, center region data and right region data, is supplied as the input pattern to the third neural network NN3 over a period of time. The third neural network NN3 takes the output vector from the second neural network NN2 at time $t-1$ (post), t (center), and $t+1$ (pre) and verifies the identity of the center character.

Figure 12:
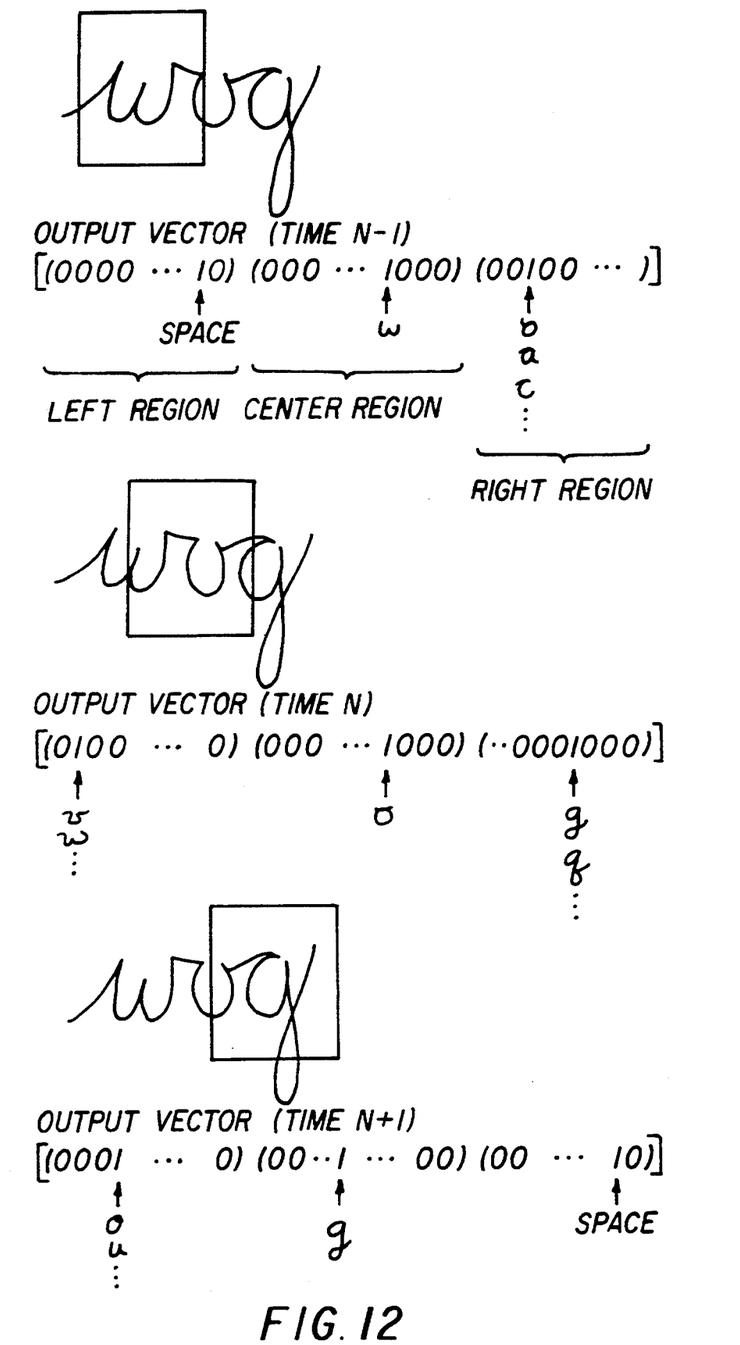
FIG. 12 illustrates the output of the second neural network over time.
Figure 13:
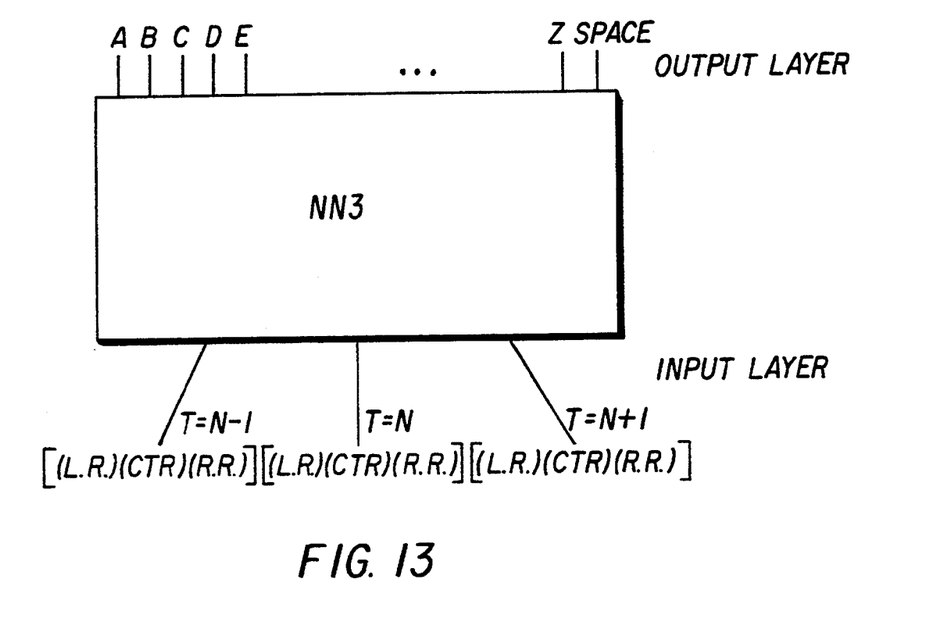
FIG. 13 illustrates the application of the output of the second neural network to the third neural network NN3.

For example, as illustrated in FIG. 12, the second neural network NN2 determined that an "o" grouping was activated in the right side of the window at time $n-1$. The output vector at time $(n-1)$ is buffered in buffer unit 106. At time n, the second neural network NN2 determined that the letter "o" was activated in the center of the window. The output vector at time (n) is the buffered using buffer unit 106. At time $(n+1)$, the second neural network NN2 determined that the "o" grouping is activated in the left side of the window. The output vector at time $(n+1)$ is then supplied as the input pattern to the third neural network along with the output vector at time $(n-1)$ and the output vector at time (n), which are retrieved from the buffer unit 106, as shown in FIG. 13, and the third neural network identifies the center character and its confidence value. In this case, the third neural network NN3 would confirm that the character to be identified is an "o" because the "o" grouping appeared at both the pre-character and post-character positions as well as the center character position. If for some reason the "o" had not appeared in one of the pre-character or post-character positions, the character may still be identified as an "o", but with a lesser confidence value. The output vector from the third neural network NN3 can either be converted to ASCII character data or be supplied to a post processor for further processing.

The CSR system described above has several advantages over conventional systems. For example, the difficult task of character segmentation is avoided. The disclosed system is very-fast due to the use of neural network architecture and does not require feature extraction. The system is also very flexible and can be expanding to accommodate new character classes without requiring a redesign of the entire system. Instead, training of the new classes can be performed on a larger computing system and then the weights can be downloaded to the CSR system.

The system is neither a cursive word recognition system nor a "segment then recognize character" system. Instead the disclosed system recognizes cursively written characters in their naturally connected structure. The system is based, in part, on the recognition that the ligatures connecting the characters in cursive script are dependent on the characters themselves. The disclosed system captures the ligature information by describing the left and right end of the window which contains "parts of characters" collected into character groups. A greater degree of recognition accuracy is therefore attained by integrating the information found in the center of the window with the "grouping" information of the neighboring characters.

The invention has been described with particular reference to certain preferred embodiments thereof. It will be understood, however, that modifications and variations are possible within the scope of the appended claims. For example, the functions performed by the invention can either be accomplished using hardware implementations of the various elements, a central processor, or combinations thereof.

Industrial Utility

The invention is useful as an optical character recognition system for reading cursive script that is either scanned on-line or scanned and retained as bitmap image data.

What is claimed is:

1. An apparatus for performing cursive script recognition comprising:
   center determining means including a first neural network for determining the spatial location of the centers of individual cursive characters contained within digitized cursive word data;
   normalization means for defining a left and right edge of a fixed size window based on the spatial location of the centers of the individual cursive characters determined by the center determining means; and
   recognition means including a second neural network for locating the fixed size window on a segment of the cursive word data, wherein the left side of the window is centered on a first character contained within the segment such that a righthand portion of the first character is located within the window, the right side of the window is centered on a third character contained within the segment such that a lefthand portion of the third character is located within the window, and the center of the window is approximately centered on a second character contained within the segment such that the entire second character is located within the window, and for identifying a class grouping for the first character and a class grouping for the third character based upon similarities in the ligature structures of the righthand portion of the first character, that connect the first character to the second character, and the ligature structures of the lefthand portion of the third character, that connect the third character to the second character, to the ligature structures of characters within the class groupings, and identifying the second character based on a relationship of its ligature structure with respect to the ligature structures of the class groupings identified for the first and third characters.

2. An apparatus for performing cursive script recognition as claimed in claim 1, further comprising verification means including a third neural network for verifying the identity of a character based on the response of the recognition means when the character was the first character in the fixed window at a time $(n-1)$, when the character was the second character in the fixed window at a time (n), and when the character was the third character in the fixed window at a time $(n+1)$.

* * * * *